(12) United States Patent
Cook et al.

(10) Patent No.: US 8,797,146 B2
(45) Date of Patent: Aug. 5, 2014

(54) AUTONOMOUS BATTERY-FREE MICROWAVE FREQUENCY COMMUNICATION SYSTEM

(75) Inventors: Benjamin W. Cook, Berkeley, CA (US); Axel D. Berny, Berkeley, CA (US); Jason A. Trachewsky, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 414 days.

(21) Appl. No.: 13/092,586

(22) Filed: Apr. 22, 2011

(65) Prior Publication Data

US 2011/0260839 A1    Oct. 27, 2011

Related U.S. Application Data

(60) Provisional application No. 61/328,291, filed on Apr. 27, 2010.

(51) Int. Cl.
*H04Q 5/22* (2006.01)
*H04B 1/38* (2006.01)

(52) U.S. Cl.
USPC ......................... 340/10.4; 340/10.34; 455/573

(58) Field of Classification Search
USPC .......... 235/375, 385, 492; 340/539.1–539.12, 340/571–572.7, 10.1–10.6; 455/127.1, 455/343.1, 573
See application file for complete search history.

(56) References Cited

U.S. PATENT DOCUMENTS

| | | | |
|---|---|---|---|
| 7,400,253 B2 * | 7/2008 | Cohen ........................... | 340/572.1 |
| 8,621,245 B2 * | 12/2013 | Shearer et al. ................. | 713/300 |
| 2003/0104848 A1 * | 6/2003 | Brideglall ....................... | 455/574 |
| 2005/0186994 A1 * | 8/2005 | Rahmel et al. ................. | 455/572 |
| 2006/0180647 A1 * | 8/2006 | Hansen ........................... | 235/375 |
| 2007/0008121 A1 * | 1/2007 | Hart ............................... | 340/540 |
| 2007/0109121 A1 * | 5/2007 | Cohen ........................ | 340/539.26 |
| 2007/0173214 A1 * | 7/2007 | Mickle et al. ............... | 455/127.1 |
| 2007/0281657 A1 * | 12/2007 | Brommer et al. ............. | 455/334 |
| 2009/0284245 A1 * | 11/2009 | Kirby et al. .................... | 323/318 |
| 2009/0318779 A1 * | 12/2009 | Tran .............................. | 600/301 |
| 2012/0007441 A1 * | 1/2012 | John ............................. | 307/104 |
| 2012/0299706 A1 * | 11/2012 | Koo et al. .................... | 340/10.1 |

OTHER PUBLICATIONS

Miller, Brent; "Bluetooth Revealed"; published by Prentiss Hall PTR, Upper Saddle River, NY 07458; Copyright 2001; ISBN 0-13-090294-2; pp. 48-51.*

Gast, Matthew S., "802.11 Wireless Networks: The Definitive Guide", 2002, O'Reilly, Sebanstopol, CA, 1st Edition, ISBN:0596001835, pp. 109-110.*

* cited by examiner

*Primary Examiner* — Benjamin C Lee
*Assistant Examiner* — Stephen Burgdorf
(74) *Attorney, Agent, or Firm* — Michael H. Lyons

(57) ABSTRACT

An autonomous battery-free microwave frequency communication device which includes a capacitance, at least one antenna, a microwave energy harvesting system, a microwave frequency transceiver, and a control system. The energy harvesting system is configured to harvest and store microwave energy received via the antenna onto the capacitance. The transceiver is empowered by energy stored on the capacitance, and is configured to autonomously generate a microwave frequency carrier and to autonomously transmit information using the microwave frequency carrier according to a predetermined communications protocol via the antenna. The control system is empowered by energy stored on the capacitance, and is configured to provide information for transmission. Energy may be harvested from various communication forms, such as wireless network protocols or cellular communications. The frequency band from which energy is harvested may differ from the frequency band used for communications. The energy storage enables autonomous communications with external devices according to common or standard wireless communication protocols.

21 Claims, 9 Drawing Sheets

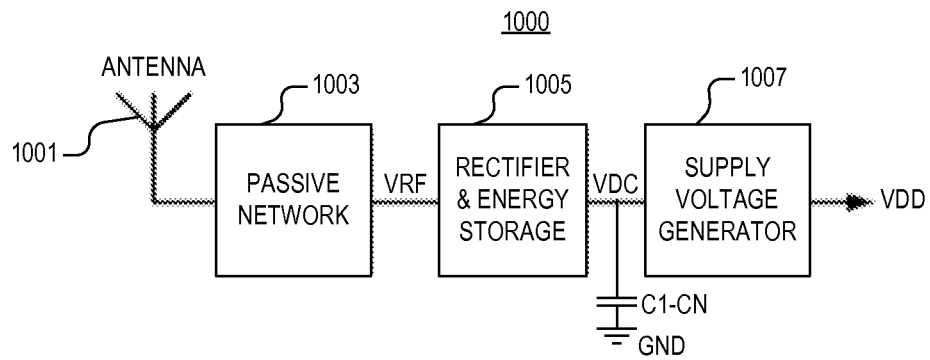
FIG. 10
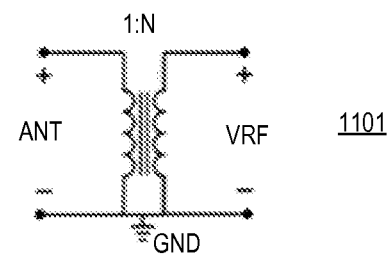
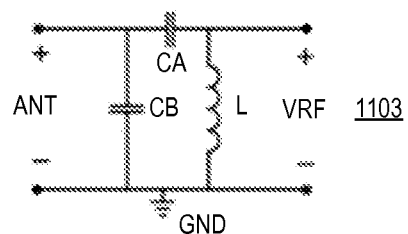
FIG. 11 (PRIOR ART)
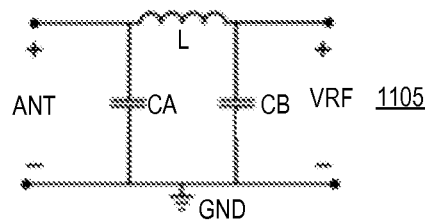

AUTONOMOUS BATTERY-FREE MICROWAVE FREQUENCY COMMUNICATION SYSTEM

CROSS-REFERENCE TO RELATED APPLICATIONS

This application claims the benefit of U.S. Provisional Application Ser. No. 61/328,291, filed on Apr. 27, 2010 which is hereby incorporated by reference in it entirety for all intents and purposes.

BACKGROUND OF THE INVENTION

1. Field of the Invention

The present invention relates generally to communications systems, and more particularly to an autonomous battery-free microwave frequency communication device.

2. Description of the Related Art

A conventional battery-free contact-less wireless communication device is known which is based upon the ISO/IEC (International Organization for Standardization/International Electrotechnical Commission) 14443 near-field communication specification, which uses a relatively-low carrier frequency of 13.56 megaHertz (MHz) and relatively-low data rates of up to 848 kilobits per second (kbps) and involves a battery-powered reader referred to as a "Proximity Coupled Device" or PCD and a battery-free, energy-harvesting "tag" referred to as a "Proximity Integrated Circuit Card" or PICC. The power used to transmit the data read/write requests from the PCD to the PICC is inductively coupled from PCD to PICC at a range of approximately 20 centimeters (cm) or less which is within the "near field" of the PCD. The PICC communicates responses to the PCD by modulating a load according to backscatter communications. In accordance with backscatter communications, there is no active modulation of a signal transmitted from PICC to PCD, there is no generation of an independent carrier by the PICC transmitter, and the PICC must be in the near field of the PCD. The near field is necessary to establish magnetic coupling in which communication is based on induced current. These systems commonly have a simple integrated state machine and associated memory and are currently used in some contact-less credit and debit cards as well as identification cards.

Certain standards that cover near-field communications (NFC) with passive tags include, but are not limited to, ISO/IEC 14443 and 15693 (13.56 MHz carrier frequency), ISO/IEC 18000 (135 kiloHertz (kHz), 13.56 MHz, 2.45 gigaHertz (GHz), 860-960 MHz, and 433 MHz), ISO/IEC 18092 and 21481. ISO 18000-4, in particular, uses the 2.4-2.5 GHz band and has an option for microwave-frequency communication with a passive tag using backscattering.

FIG. 1 is a figurative and schematic diagram illustrating a conventional Radio Frequency Identification (RFID) near-field communication system 100 with an active RFID reader 101 and a passive RFID tag 103 that responds to the active RFID reader 101 via backscattering, very much like a radar illuminating a target. The active RFID reader 101 includes a magnetic loop antenna 105 which is placed in close proximity with a magnetic loop antenna 107 of the passive RFID tag 103 to establish a magnetic field 106. The passive RFID tag 103 further includes a shunt capacitance $C_{TUNE}$, a switch SW, a full-wave rectifier 109 and a storage capacitor $C_S$ coupled to the magnetic loop antenna 107, in which $C_S$ develops a supply voltage VS for providing power to an RFID tag integrated circuit (IC) 111. The switch SW includes a series resistance $R_{SW}$ (which may or may not be a separate physical resistor, but may instead represent the series resistance of the switch SW). The RFID tag IC 111 is shown including a receive (RX) detector 113, control logic 115, transmit (TX) switch control 117 and memory 119.

In this RFID system, the active RFID reader 101 operates as an interrogator which develops the magnetic field 106 to provide power and which further modulates the magnetic field 106 to enable communication with tags that are within their range, such as the passive RFID tag 103. When the active RFID reader 101 is placed in close proximity with the passive RFID tag 103, the magnetic loop antenna 107 develops inductive current which is converted to voltage across CS for providing power to the RF tag IC 111. The active RFID reader 101 further modulates the magnetic field 106 to send data, which is detected by the RX detector 113. Such modulation may be according to any suitable form, such as amplitude modulation (AM) (e.g., on-off key AM), frequency modulation (FM) or phase modulation (PM). The control logic 115 retrieves the data and may provide a response by controlling the switch SW via the TX switch control 117. During the time that the passive RFID tag 103 communicates back to the active RFID reader 101, the active RFID reader 101 broadcasts a steady radio frequency (RF) power level via the magnetic field 106, and the passive RFID tag 103 modulates the impedance of its RF load attached to the magnetic loop antenna 107 by adjusting its reflectivity by controlling the switch SW coupled with other passive components, such as $C_{TUNE}$. The active RFID reader 101 then receives the data back from the passive RFID tag 103 as a variation in reflection of its transmitted power.

In this system, the passive RFID tag 103 can only send data to the nearby interrogator/reader, e.g., the active RFID reader 101, and the active RFID reader 101 sends data (by induced current) to the passive RFID tag 103. The passive RFID tag 103 sends data back to the active RFID reader 101 only while it broadcasts energy (e.g., while sending an un-modulated carrier signal via the magnetic field 106). The passive RFID tag 103 does not store energy for later use, and it does not generate its own RF carrier. Furthermore, the magnetic loop antennas 105 and 107 are typically rather large and are not commonly available for many types of devices, such as cellular phones or smart phones and the like. The active RFID reader 101, for example, is typically a tablet or hand scanner or the like particularly configured for RFID tag communications.

The conventional RFID tag communication systems, such as the communication system 100, have several disadvantages. The disadvantages include, for example, the need to have a relatively-large antenna to obtain sufficient energy-harvesting efficiency for the low carrier frequency (long wavelength of over 22 meters) and the lack of available reader interfaces in common devices like mobile phones and portable computers and the like. The conventional RFID tag communication systems operate in lower frequency ranges, such as tens of MHz, and operate at relatively low data rates, such as less than 1 megabit per second (Mbps).

Other systems, e.g., using 902-928 MHz for ultra high frequency (UHF) RFID harvest energy but also use backscatter communications. One potential advantage of such devices is that they operate using microwave frequencies. As used herein, microwave frequencies are within the range of about 300 MHz to about 300 GHz. Microwave frequency communications enable the use of relatively small antennas (<2 cm on a side) for increased energy-harvesting efficiency. The disadvantage of 902-928 MHz UHF systems, however, is that they also are not integrated into common devices like mobile phones and portable computers and the like. The common devices typically use Bluetooth or WiFi (802.11) technology, which are already integrated into cellular telephone handsets.

It is desired to provide RFID-type communications using battery-free passive tags that are able to communicate with common devices, such as those which operate using standard microwave frequency communications (e.g., Wi-Fi, Bluetooth, etc.).

SUMMARY OF THE INVENTION

An autonomous battery-free microwave frequency communication device according to one embodiment includes a capacitance, at least one antenna, a microwave energy harvesting system, a microwave frequency transceiver, and a control system. The microwave energy harvesting system is configured to harvest and store microwave energy received via the antenna onto the capacitance. The microwave frequency transceiver is empowered by energy stored on the capacitance, and is configured to autonomously generate a microwave frequency carrier and to autonomously transmit information using the microwave frequency carrier according to a predetermined communications protocol via the antenna. The control system is empowered by energy stored on the capacitance, and is configured to provide information for transmission.

A method of performing autonomous communications by a battery-free device according to one embodiment includes receiving microwave energy via at least one antenna, harvesting the received microwave energy and storing harvested energy on a storage capacitance, generating at least one data frame formatted according to a first communications protocol using energy stored on the storage capacitance, generating a microwave frequency carrier using energy stored on the storage capacitance, modulating the microwave frequency carrier with the data frame using energy stored on the storage capacitance to provide a modulated information, and transmitting the modulated information via the at least one antenna using energy stored on the storage capacitance.

A wireless radio frequency tag device according to one embodiment includes a physical article configured for a predetermined purpose, and an autonomous battery-free microwave frequency communication device according to embodiments of the present invention and embedded on the physical article to enhance the predetermined purpose. The physical article may take on any of many different types of formats, such as wristbands, advertisement flyers, cards, etc.

BRIEF DESCRIPTION OF THE DRAWINGS

The benefits, features, and advantages of the present invention will become better understood with regard to the following description, and accompanying drawings where:

FIG. 10 is a block diagram of an exemplary microwave energy harvesting and storage network implemented according to an embodiment of the present invention;

FIGS. 11 and 12 illustrate various conventional circuits which may be used to implement portions of the exemplary microwave energy harvesting and storage network of FIG. 10.

DETAILED DESCRIPTION

Figure 1:
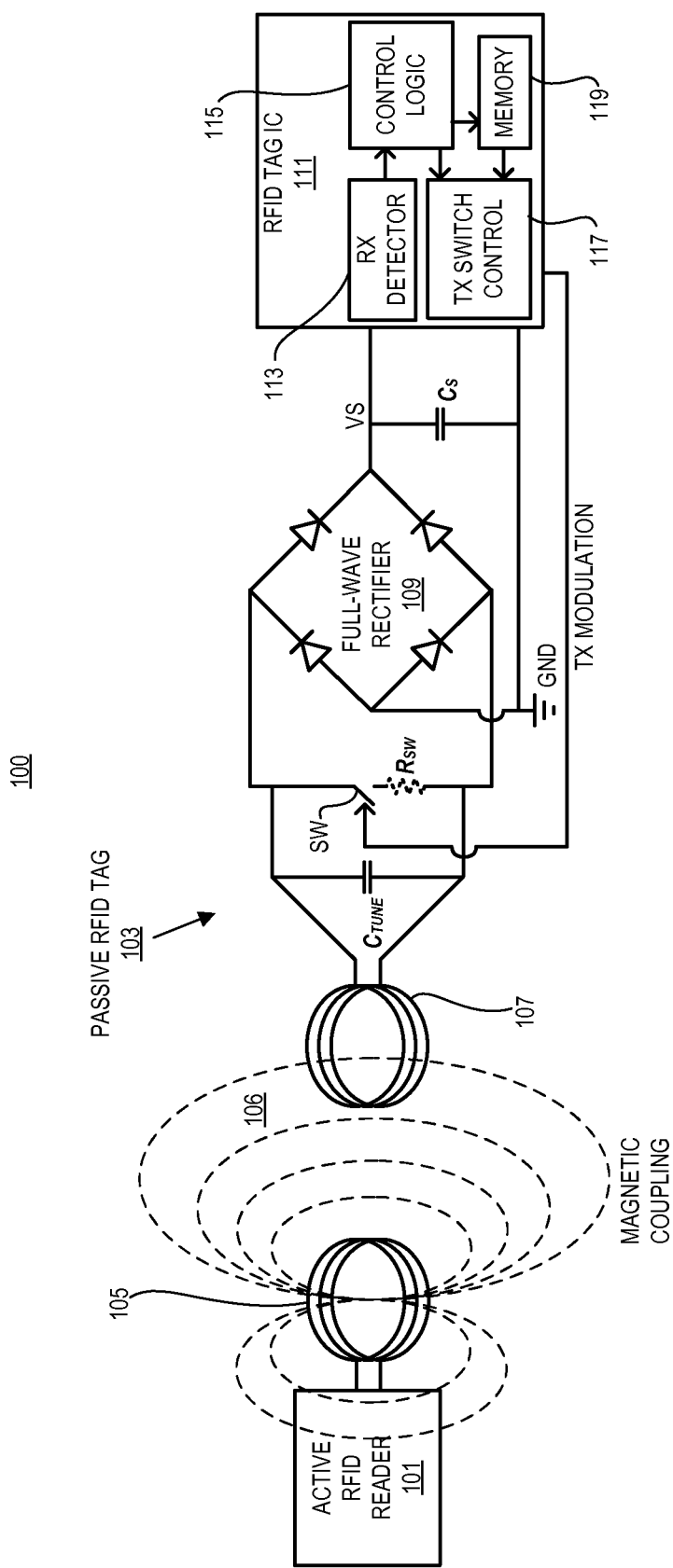
FIG. 1 is a figurative and schematic diagram illustrating a conventional Radio Frequency Identification (RFID) near-field communication system with an active RFID reader and a passive RFID tag that responds to the active RFID reader using backscattering communications.

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Various embodiments disclosed herein incorporate a microwave frequency energy harvesting system coupled to one or more antenna(s) tuned to a range of frequencies and a microwave-frequency transceiver for communications in a network of two or more devices. Energy harvesting may occur when the receiving antenna(s) on the battery-free device is (are) in the far field, the near field, or between the near and far fields of the transmitting antenna(s) in the device providing energy. The same or a different antenna or set of antennas is used for communications. A different set of antennas may be used either to achieve additional gain from directive reception for energy harvesting while simultaneously allowing omni-directional transmission of data from the battery-free device to the device providing energy and possibly other devices or to enable different frequency bands to be used for powering the battery-free device and communicating with the battery-free device.

In one set of embodiments, the battery-free device may implement an IEEE (Institute of Electrical and Electronics Engineers) 802.11-compliant radio with an active power amplifier in the 2.4-2.5 GHz band and also implement an energy-harvesting system that draws power from the received 802.11 signal and is tuned to the 2.4-2.5 GHz band. In various embodiments, the battery-free device generates its own microwave frequency carrier signal using dedicated internal circuitry, such as phase-locked loops (PLLs), mixers, and reference frequency oscillators. Various embodiments of this device may use multiple antennas with directional reception to collect a larger amount of received power from the 802.11 transmissions, each directional antenna coupled to one or more energy-harvesting circuit(s).

In another set of embodiments, the battery-free device may implement a Bluetooth compliant or Wi-Fi compliant radio in the 2.4-2.5 GHz band (Wi-Fi or Bluetooth) or 4.9-6.0 GHz band (Wi-Fi) and may also implement one or more energy-harvesting circuits(s) tuned to one or more of the cellular telephony uplink transmission bands. Other combinations using one or more frequency bands and energy-harvesting circuits are envisioned. Wi-Fi is a trademark of the Wi-Fi Alliance, which includes various wireless local area network (WLAN) protocols based on the IEEE 802.11 standard along with other wireless communication protocols as known to those of ordinary skill in the art. Bluetooth is a wireless technology based on an industry group specification typically used for exchanging data over relatively short distances.

Various embodiments disclosed herein may integrate the microwave frequency battery-free device with a controller subsystem and memory to store various content. The controller subsystem may include finite-state machines, microcontrollers, microprocessors, bus interfaces, and/or peripheral circuitry. Memory may include non-volatile and/or volatile memory and may be one-time and/or many-time programmable.

Various embodiments disclosed herein may incorporate passive networks for boosting the voltage received from the antenna(s) in order to more effectively activate subsequent voltage rectifier circuits which may otherwise not be capable of capturing substantial power.

Various embodiments disclosed herein also incorporate the microwave frequency battery-free device in a network involving a communication device that also provides energy to the battery-free device and a further communication link from the device providing energy to the battery-free device to a wireless access point or base station that provides a further connection to servers on an intranet or the larger Internet. An intranet in this description may be a corporate or hospital network hosted in a building or through distributed data centers or a network including Virtual Private Network (VPN) links. Examples are included showing usages of the autonomous battery-free microwave-frequency radio device in a network possibly including wireless access points or cellular base stations and servers in an intranet or the larger Internet. The server(s) receive(s) data from the phone or other device that connects to the battery-free device and provides it energy; these data may include processed information from the battery-free device. The server(s) may send responses to the processed information back to the phone or other device connected to the battery-free device.

Figure 2:
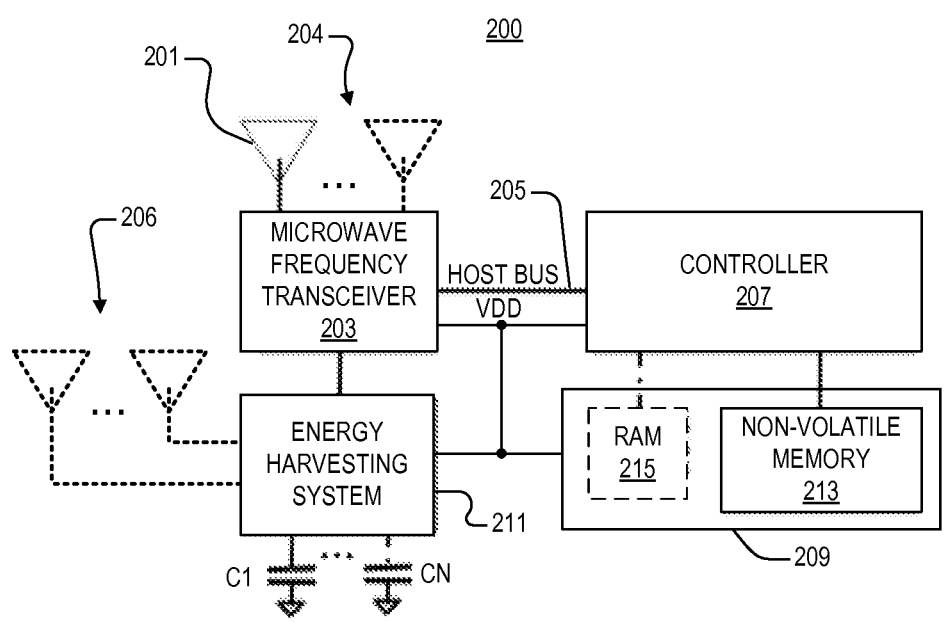
FIG. 2 is a block diagram of an autonomous battery-free microwave frequency RF tag according to one embodiment of the present invention.

FIG. 2 is a block diagram of an autonomous battery-free microwave frequency RF tag 200 according to one embodiment of the present invention. The tag 200 includes a microwave frequency antenna 201 coupled to a microwave frequency transceiver 203. The microwave frequency transceiver 203 is further coupled via a host bus 205 to a controller 207. The controller may be configured in any suitable manner, such as a microprocessor or other type of processor, a programmable state machine or the like, a hard-coded state machine or the like, etc. The controller 207 is coupled to a memory 209. The microwave frequency transceiver 203 is also shown coupled to an energy harvesting system 211, which stores energy on at least one energy storage capacitor C1. Additional storage capacitors may be included. As shown, for example, N storage capacitors C1-CN are shown coupled to the energy harvesting system 211 (in which N is any positive integer including zero). The energy harvesting system 211 may include one or more separate energy harvesting circuits. The energy harvesting system 211 develops a regulated supply voltage VDD, which is provided to other components in the tag 200, such as the microwave frequency transceiver 203, the controller 203, and the memory 209.

The memory 209 includes non-volatile memory 213. The non-volatile memory 213 is desired to preserve information when the tag 200 has exhausted its stored energy supply provided by charge on the one or more capacitors C1-CN. Additionally, the memory 209 may include volatile memory, such as random access memory (RAM) 215 or the like (shown in dashed lines). In certain configurations the RAM 215 may be omitted as consuming significant energy.

In one embodiment, the tag 200 is a single antenna system in which the microwave antenna 201 is used for both energy harvesting by the energy harvesting system 211 and communications by the microwave frequency transceiver 203. In another embodiment, one or more additional microwave antennas, such as shown at 204, may be included and coupled to the microwave frequency transceiver 203. In this case the multiple antennas are shared between the microwave frequency transceiver 203 and the energy harvesting system 211. In yet another embodiment, one or more additional microwave antennas, such as shown at 206, may be included and coupled to the energy harvesting system 211. In this case, the one or more antennas coupled to the microwave frequency transceiver 203 are used for data communications, and the one or more antennas coupled to the energy harvesting system 211 are used for energy harvesting and storage.

The energy harvesting system 211 is coupled either to the same antenna(s) used by the microwave frequency transceiver 203 or to separate antennas. Separate antennas may be preferable in the case that the tag 200 is configured to communicate with far-away devices that may be placed in arbitrary positions with respect to the tag 200. In this case, the long-distance path may prefer the use of omni-directional antennas, while the energy harvesting system 211 prefers strongly directional antennas to pick up a maximum amount of power from a nearby transceiver that may be oriented in a particular manner. One or more antennas may be used; more than one antenna may be used if "sectorized" transmission with high-gain antennas is desired to improve range while also enabling flexibility in the positioning of other devices that are providing energy and/or information.

The tag 200 is "battery-free" meaning that it does not receive power from any other source other than that which is stored on the capacitance of the energy storage capacitors C1-CN. The tag 200 is "autonomous" meaning that it does not rely on energy being transmitted by an external device at the same time that that tag 200 transmits information. As further described below, the microwave frequency transceiver 203 of the tag 200 generates its own microwave frequency carrier and modulates the carrier for data transmission rather than relying on an un-modulated carrier provided by an external device. Furthermore, the microwave frequency transceiver 203 can independently receive, demodulate and process information received via the one or more antennas.

Figure 3:
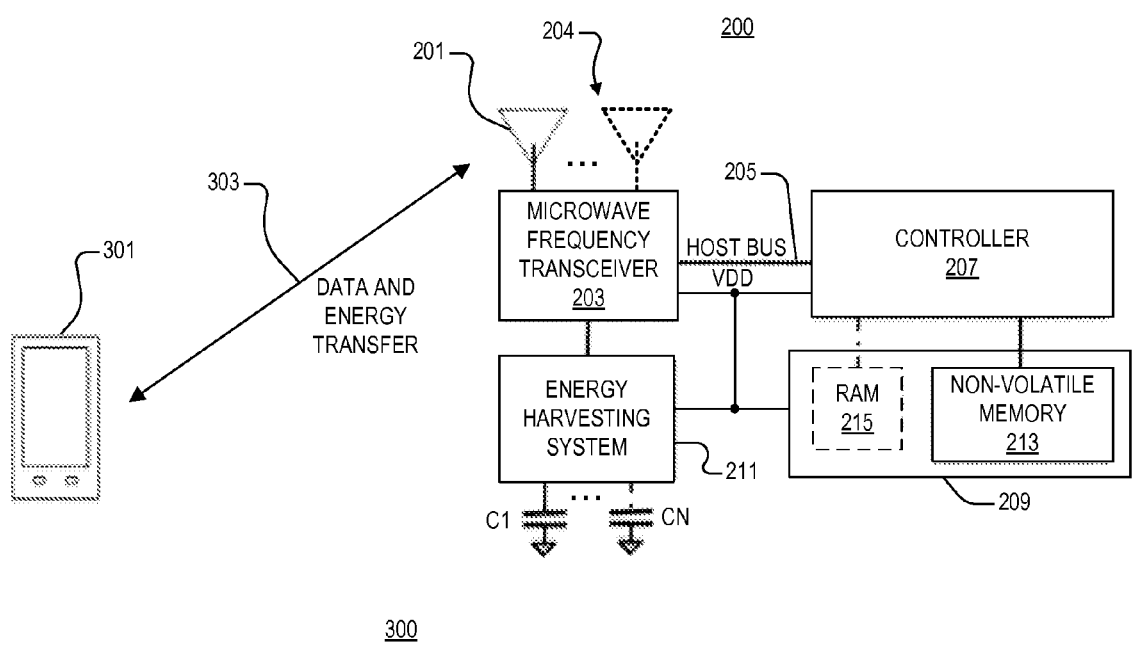
FIG. 3 is a block diagram of a communication system according to one embodiment of the present invention including the battery-free microwave frequency RF tag of FIG. 2 communicatively coupled with a battery powered device via bi-directional communication link.

FIG. 3 is a block diagram of a communication system 300 according to one embodiment of the present invention including the battery-free microwave frequency RF tag 200 communicatively coupled with a battery powered device 301 via bi-directional communication link 303. The tag 200 includes at least one shared omni-directional antenna (e.g., 201) or multiple high-gain shared antennas 201-201 which is/are used to harvest energy and send/receive data. The battery powered device 301 is a phone (cellular phone or smart phone or the like) or a tablet or similar type device which communicates according to at least one standard communication protocol, such as Wi-Fi or Bluetooth or the like.

Figure 4:
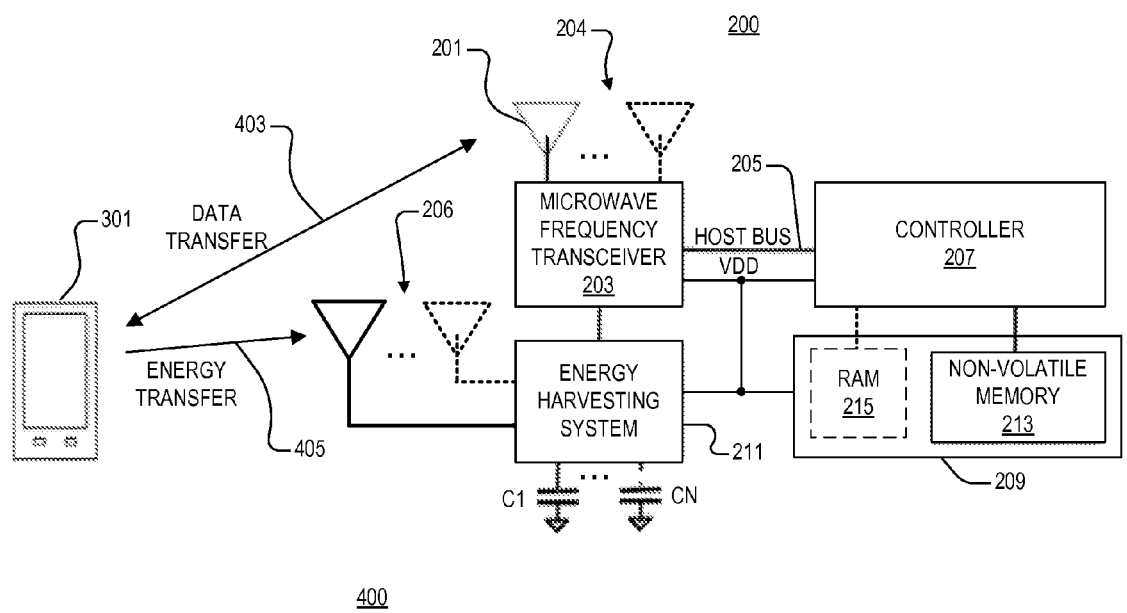
FIG. 4 is a block diagram of a communication system according to one embodiment of the present invention including the battery-free microwave frequency RF tag of FIG. 2 communicatively coupled with the device of FIG. 3 via a bi-directional communication link, which further includes an energy transfer link for transfer of energy from the powered device to the battery free tag device.

FIG. 4 is a block diagram of a communication system 400 according to one embodiment of the present invention including the battery-free microwave frequency RF tag 200 communicatively coupled with the device 301 via a bi-directional communication link 403, which further includes an energy transfer link 405 for transfer of energy from device 301 to tag 200. The tag 200 includes at least one shared omni-directional antenna (e.g., 201) or multiple high-gain shared antennas 201-201 which is/are used to send/receive data. The tag 200 further includes one or more antennas 206 coupled to the energy harvesting system 211 for energy transfer via the energy transfer link 405.

The communication link 403 is according Wi-Fi or Bluetooth or the like, in which separate antennas are used for the microwave frequency transceiver 203 and the energy harvesting system 211. In one embodiment, generally one (omni-directional) antenna is used for the microwave frequency transceiver 203 and one or more antennas 206 are used for the energy harvesting system 211. In one embodiment, a separate energy harvesting circuit within the energy harvesting system 211 is coupled to each antenna 206.

The energy transfer link 405 is facilitated in any one or more of several different communication methods. In one embodiment, the Wi-Fi or Bluetooth communications transmitted by the device 301 are also used for the energy transfer link 405 to provide energy for charging the capacitor(s) C1-CN. In an alternative embodiment, the device 301 provides energy via the energy transfer link 405 from cellular uplink transmissions. In this manner, separate frequency bands and protocols may be used for energy harvesting and data communications. In one embodiment, for example, the Wi-Fi or Bluetooth microwave frequency bands are used for communication and a transceiver in one or more of the licensed cellular bands provides energy to be stored for data communication use. It is noted that the communications via link 403 may occur at the same or a different and even mutually-exclusive time from the energy transfer via link 405. While different antennas may likely be used in different bands, it is possible for all bands to be tuned using an antenna and associated passive network that are resonant in multiple bands, although at a potential reduction in efficiency.

Figure 5:
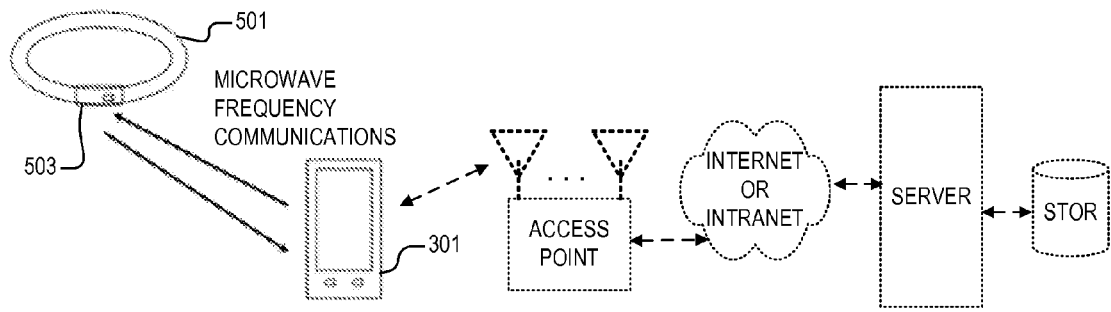
FIG. 5 is a block diagram showing a wireless disposable wristband incorporating a battery-free microwave frequency RF tag (configured according to any of the embodiments of the tag described herein) which communicates with the device of FIG. 3 using microwave frequency communications according to one embodiment.

FIG. 5 is a block diagram showing a wireless disposable wristband 501 incorporating a battery-free microwave frequency RF tag 503 (configured according to any of the embodiments of the tag 200 described herein) which communicates with the device 301 using microwave frequency communications according to one embodiment. In one embodiment, the device 301 is a smart phone or the like running a software application, in which the phone may read from and, in various embodiments, write to the tag 503 incorporated on the wristband 501. The tag 503 contains sensors and/or stored information or the like, such as, for example, medical records, administered medications or procedures (like CT scans) that had been performed on a patient earlier during hospitalization. The wireless disposable wristband 501 may also include sensors such as relative body temperature, pulse, or a pulse oximeter (SPO2) (not shown). The microwave frequencies may include the bands used for Bluetooth or Wi-Fi and/or one or more of the licensed cellular bands as previously described.

The device 301 may further communicate with additional devices, such as an access point that routes its data to and from a server or the like over either the Internet or a closed intranet or the like. The server includes or is otherwise coupled to one or more storage devices.

Figure 6:
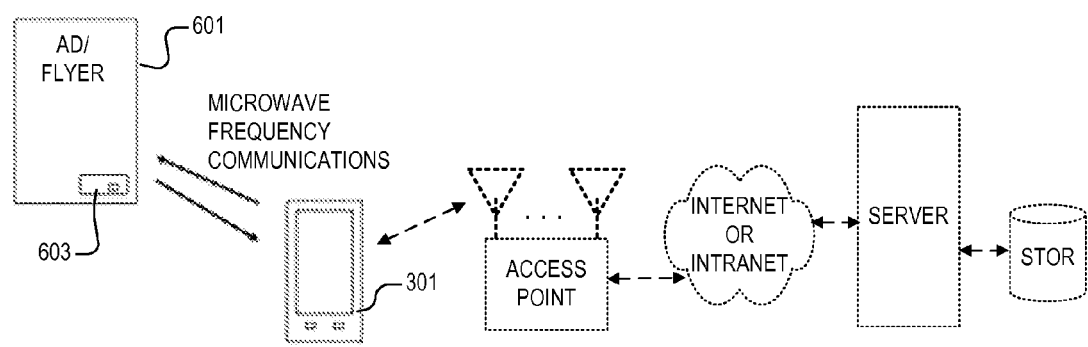
FIG. 6 is a block diagram shows a wireless advertisement or flyer (AD/FLYER) incorporating a battery-free microwave frequency RF tag (configured according to any of the embodiments of the tag described herein) which communicates with the device of FIG. 3 using microwave frequency communications according to one embodiment.

FIG. 6 is a block diagram that shows a wireless advertisement or flyer (AD/FLYER) 601 incorporating a battery-free microwave frequency RF tag 603 (configured according to any of the embodiments of the tag 200 described herein) which communicates with the device 301 using microwave frequency communications according to one embodiment. The embodiment of FIG. 6 is similar to that shown in FIG. 5 in which the wireless AD/FLYER 601 and tag 603 replaces the wireless disposable wristband 501 and RF tag 503. In one embodiment, the device 301 is a smart phone or the like running a software application, in which the phone may read from and, in various embodiments, write to the tag 603 incorporated on the wristband 501. In this case, the wireless AD/FLYER 601 with tag 603 enables localized promotions to be deployed, for example, a coupon that enables an owner of the device 301 to receive a discount at a recently-opened nearby store in the same group or chain. It also allows localization of potential customers, as the tag 603 may communicate also with store infrastructure (e.g., a nearby Wi-Fi Access Point or AP). Microwave frequencies may include the bands used for Bluetooth or Wi-Fi and/or one or more of the licensed cellular bands.

In a similar manner, the device 301 may further communicate with additional devices, such as an access point that routes its data to and from a server or the like over either the Internet or a closed intranet or the like. The server includes or is otherwise coupled to one or more storage devices.

Figure 7:
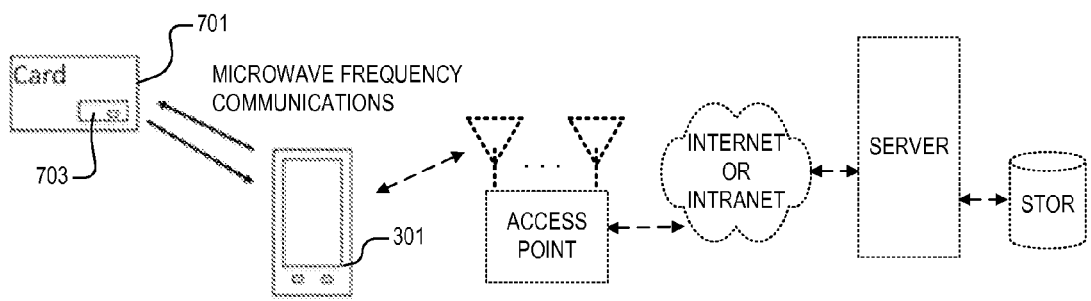
FIG. 7 is a block diagram shows a wireless credit, debit, and/or loyalty card incorporating a battery-free microwave frequency RF tag (configured according to any of the embodiments of the tag described herein) which communicates with the device of FIG. 3 using microwave frequency communications according to one embodiment.

FIG. 7 is a block diagram that shows a wireless credit, debit, and/or loyalty card 701 incorporating a battery-free microwave frequency RF tag 703 (configured according to any of the embodiments of the tag 200 described herein) which communicates with the device 301 using microwave frequency communications according to one embodiment. The embodiment of FIG. 7 is similar to that shown in FIG. 5 in which the card 701 and tag 703 replaces the wireless disposable wristband 501 and RF tag 503. In one embodiment, the device 301 is a smart phone or the like running a software application, in which the phone may read from and, in various embodiments, write to the tag 703 incorporated on the card 701. In this case, the card 701 enables localized promotions to be deployed and offers the possibility of "one card in the wallet" for multiple purposes (identification (ID), payment, promotions). Microwave frequencies may include the bands used for Bluetooth or Wi-Fi and/or one or more of the licensed cellular bands.

In a similar manner as with FIGS. 5 and 6, the device 301 may further communicate with additional devices, such as an access point that routes its data to and from a server or the like over either the Internet or a closed intranet or the like. The server includes or is otherwise coupled to one or more storage devices.

In general, a tag is a device or label or the like that has at least the property that it retains and makes available information about something to which it is associated (e.g., a price tag on merchandise, a hospital wristband, etc.). It may also update its own information about the thing to which it is associated. In each of the configurations shown in FIGS. 5-7, a physical article, such as a physical body or physical object or the like, has a physical form to achieve a particular or predetermined purpose or function, in which an autonomous battery-free microwave frequency RF tag (e.g., tag 503, 603, 703 according to the embodiment of tag 200) is embedded or provided on the physical article to enhance the targeted purpose or function. The wristband 501, for example, is physically configured to be held on a person's wrist, and the tag 503 stores or otherwise provides information associated with that person and/or a facility or event. The AD/FLYER 601 is physically configured to capture the attention of an onlooker or passer-by, and the tag 603 is provided on the AD/FLYER 601 to convey information or otherwise to offer a benefit to that person for a commercial or business purpose or the like of at least one commercial entity (e.g., localized promotion(s), coupon(s), discount(s), local business advertisement, etc.). The card 701 is physically configured in similar manner as a credit or debit card or the like to be carried by a person, and the tag 703 stores data and information to facilitate one or more commercial transactions (e.g., localized promotions, one card in the wallet, ID, payment, etc.).

Figure 8:
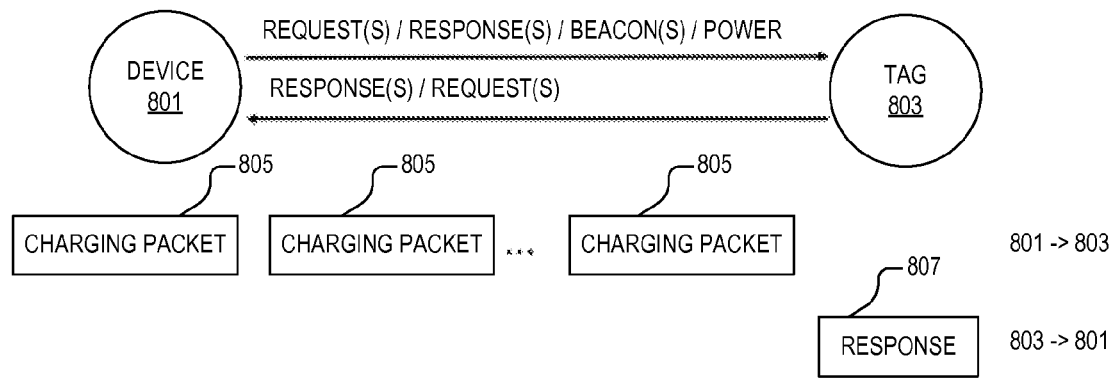
FIG. 8 is a figurative diagram showing a portion or fragment of a basic protocol for charging a battery-free microwave frequency RF tag and an initial response sent by the tag for initialization of communications according to one embodiment.

FIG. 8 is a figurative diagram showing a portion or fragment of a basic protocol for charging a battery-free microwave frequency RF tag 803 and an initial response sent by the tag 803 for initialization of communications according to one embodiment. The tag 803 is configured according to any of the embodiments of the tag 200 described herein. A device 801, which supplies energy to the tag 803, sends a sequence of one or more charging packets 805 to the tag 803. The charging packets 805 may be formatted in a manner to avoid any interoperability issues with other devices using the same band, such as those using the same protocol. In one embodiment, as further described below, the charging packets 805 may be beacons, which convey timing and network status information on a periodic basis, a form of Request, for example, a Request to Send (RTS) or data frame, or a form of Response, for example a Clear to Send (CTS) or data frame. Since there is no expectation of a response to a Beacon frame, a Beacon is a good choice for the charging packet 805. A CTS sent to the sender's own device address also results in no expectation of a response. A RTS may be sent repeatedly.

Once sufficiently charged, the tag 803 returns a response 807 back to the device 801. In this manner, further two-way communication may occur. It is appreciated that once the tag 803 is sufficiently charged, the response 807 may be sent autonomously by the tag 803, such that it may be performed at any time even when the device 801 (or any other device) is not transmitting information or otherwise generating microwave energy in the wireless medium. The energy stored by the tag 803 may further be used at a somewhat later time to communicate with a different device.

Figure 9:
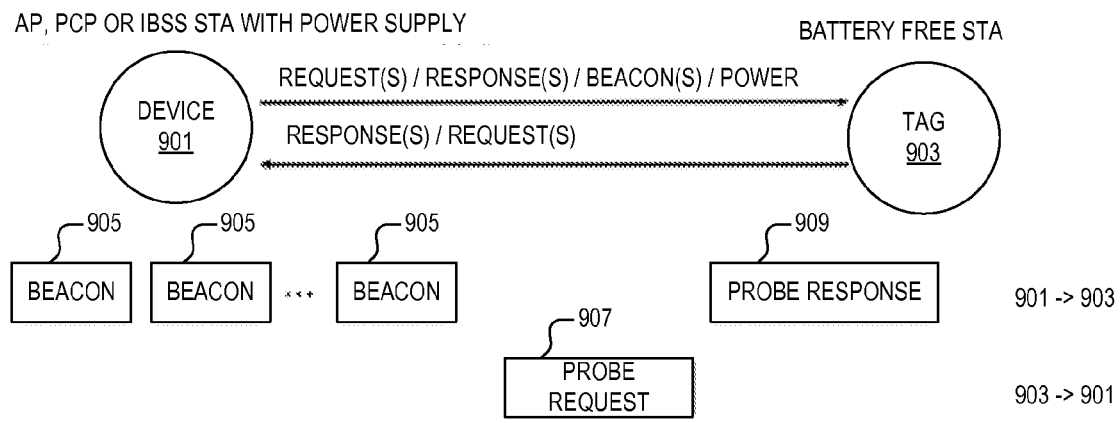
FIG. 9 is a figurative diagram showing a fragment of the 802.11 WLAN protocol, in which charging a battery-free microwave frequency RF tag is accomplished by beaconing according to one embodiment.

FIG. 9 is a figurative diagram showing a fragment of the 802.11 WLAN protocol, in which charging a battery-free microwave frequency RF tag 903 is accomplished by beaconing according to one embodiment. A device 901, which supplies energy to the tag 903, sends a sequence of one or more beacons 905 to the tag 903. The device 901 is configured as an access point (AP), a Personal Basic Service Set (PBSS) Central Point (PCP) device, a Wi-Fi Direct Group Owner, a member of a Wi-Fi Direct Group or an Independent Basic Server Set Station (IBSS STA) powered by a power supply or battery or the like. Subsequently the tag 903 responds with a probe request 907 and the two devices 901 and 903 become associated. 802.11 beacons typically include both implicit (based on relative temporal position to other transmitted frames) and explicit timing information (in the frame payload) for the Basic Service Set (BSS), point-to-point link or other type of network.

A variable number of beacons 905 is transmitted by the device 901 to charge the tag 903. The particular number of beacons 905 is determined by a number of factors, such as the distance and/or orientation between the 901 and 903. More time for charging (more beacons 905) may be needed for a larger distance between 901 and 903, because less energy is harvested per packet due to loss in the wireless channel. Once a sequence of beacons 905 (usually with short beacon interval) has been transmitted and the tag 903 is sufficiently charged, the tag 903 may send a probe request 907 to the device 901 in an autonomous manner as illustrated. The probe request 907 is the first step in associating 901 and 903 in any band that allows active scanning by new devices for other devices. The device 901 responds with a probe response 909, and other frame exchanges could then occur to enable the tag 903 to send and receive larger amounts of data to/from the device 901.

FIG. 10 is a block diagram of an exemplary microwave energy harvesting and storage network 1000 implemented according to an embodiment of the present invention which may be used to implement the energy harvesting system 211 including each of one or more energy harvesting circuits within the system 211. A passive network 1003 is coupled to an antenna 1001 for amplifying a received microwave signal in a particular band or band(s). The antenna 1001 and the passive network 1003 are collectively configured to generate the largest possible output voltage, shown as an AC voltage VRF. A rectifier & energy storage circuit 1005 receives VRF and produces a DC voltage VDC which is stored by an energy-storage capacitance, such as the capacitor(s) C1-CN represented by a capacitor coupled between VDC and GND. A supply voltage generator circuit 1007 receives VDC and produces the regulated voltage VDD which is sufficiently accurate as a source voltage for digital and analog/RF circuits. The antenna 1001 represents any of the antennas 201, 204 and/or 206 previously described.

The passive network 1003 and the rectifier & energy storage circuit 1005 collectively harvest and store energy received via one or more antennas. The term "harvest" and its various forms as used herein means the conversion of received microwave energy into energy (e.g., voltage) for storage on the storage capacitance, which is used to develop the supply voltage VDD for remaining circuitry in the tag device.

The passive network 1003, the rectifier & energy storage circuit 1005, and the supply voltage generator circuit 1007 may each be implemented according to well-known or otherwise available configurations.

FIG. 11, for example, shows several conventional configurations for implementing the passive network 1003, including a wideband step-up transformer 1101, an LC resonant structure 1103, and a resonant pi-network 1105. The wideband step-up transformer 1101 boosts a voltage of the antenna (shown as ANT) by a factor 1:N using magnetically-coupled coils to produce the output VRF. The voltage of VRF is thus N times larger than the antenna voltage ANT, and AC voltages within a large range of frequencies are boosted. The LC resonant structure 1103 includes an inductor L and capacitors CA and CB which are configured as illustrated to provide narrowband voltage gain from ANT to VRF. The resonant pi-network 1105 includes an inductor L and capacitors CA and CB which are configured as illustrated to implement a low-pass filter with cut-off frequency with adjustable in-band gain. Many other similar types circuits may be employed for implementing the passive network 1003.

Figure 12:
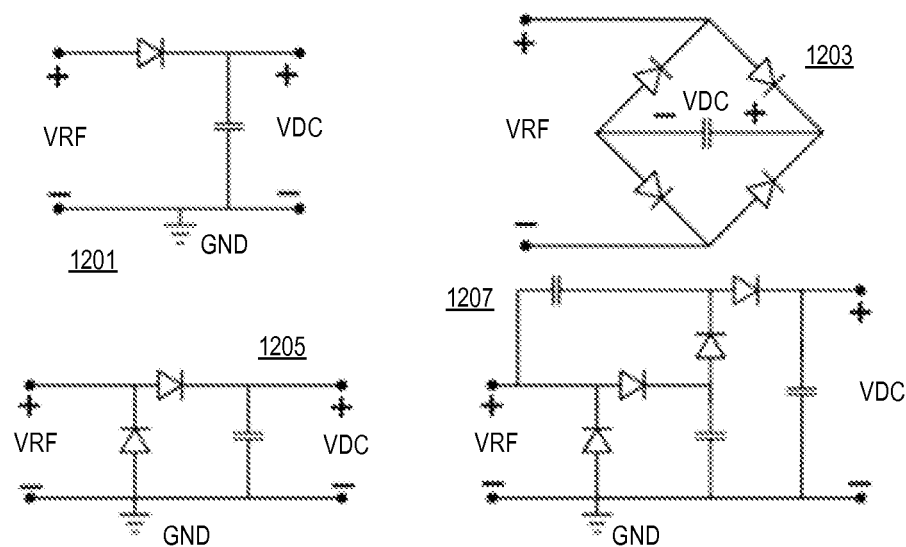

FIG. 12 shows several conventional configurations for implementing the rectifier & energy storage circuit 1005, each configured with a combination of one or more diodes and one or more capacitors, including a half-wave rectifier 1201, a full-wave rectifier 1203, a voltage doubling rectifier 1205 for producing higher DC output voltage, and a two series-stacked voltage doubling rectifier circuit 1207 for further increasing DC output voltage beyond that produced by 1205. Many other similar types circuits may be employed for implementing the rectifier & energy storage circuit 1005. Each of the diodes may be configured in any suitable manner as known by those of ordinary skill in the art, such as a simple PN junction diode, a diode-connected metal-oxide semiconductor, field-effect transistor (MOSFET), a Schottky diode, a diode-connected bipolar junction transistor (BJT), etc.

The supply voltage generator 1007 may be configured using many types of voltage converters or regulators or the like as known by those of ordinary skill in the art, such as, for example, a switching DC-DC converter (buck, boost, buck-boost, etc.) or a low dropout (LDO) regulator or the like.

Figure 13:
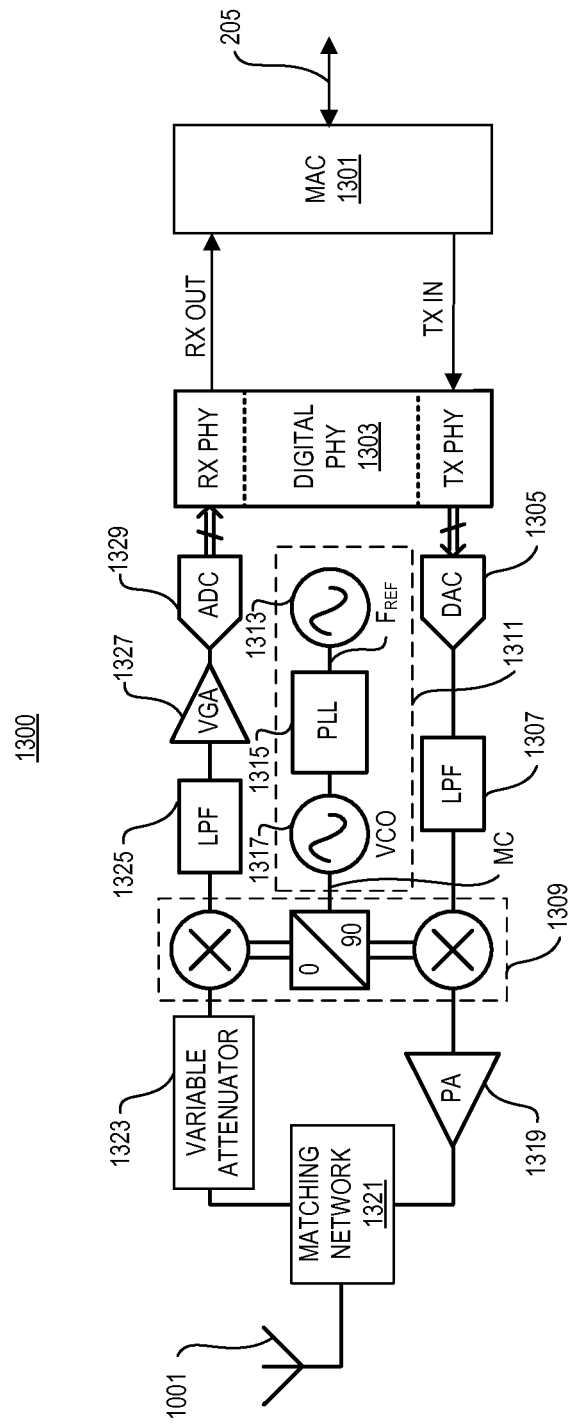
FIG. 13 is a schematic and block diagram of a microwave frequency radio transceiver which may be used to implement the microwave frequency transceiver of the tag of FIG. 2.

FIG. 13 is a schematic and block diagram of a microwave frequency radio transceiver 1300 which may be used to implement the microwave frequency transceiver 203 of the tag 200. A media access control (MAC) device 1301 interfaces the controller 207 via the host bus 205 and is further coupled to a digital physical layer (PHY) device 1303. The MAC 1301 and the TX PHY portion of the PHY device 1303 controls the radio and turns bits from the controller 207 into modulated symbols (e.g. BPSK or QPSK constellation points or an OFDM multiplex with some sub-carrier constellations), in which the modulated symbols are interpolated and pulse-shaped and then provided to the input of a digital to analog converter (DAC) 1305. The MAC 1301 and/or the digital PHY 1303 and/or the DAC 1305 individually or collectively form a frame generation circuit. The analog output of the DAC 1305 is provided to the input of a low-pass filter (LPF) 1307 for removing aliases from the DAC 1305. The LPF 1307 may provide gain or attenuation. The filtered output of the LPF 1307 is provided to an input of an in-phase quadrature-phase (90-degree) mixer 1309, which translates the filtered signal from baseband (centered at DC) to some relatively-higher carrier frequency, e.g., 2.4-2.5 GHz. The mixer 1309 may be referred to as a modulator circuit for information to be transmitted, and further as a demodulator circuit for received information.

The transceiver 1300 includes a carrier frequency generator 1311, which includes an oscillator 1313 generating a frequency reference signal $F_{REF}$. The oscillator 1313 may be implemented by a crystal oscillator or the like and may be simply pass through an externally-generated $F_{REF}$ reference frequency signal. The $F_{REF}$ signal provides the input to a Phase-Locked Loop (PLL) 1315 and a voltage controlled oscillator (VCO) 1317 for generating the microwave carrier frequency signal MC. The MC signal is provided to an input of the mixer 1309. A TX output of the mixer 1309 is provided to the input of a power amplifier (PA) 1319 to amplify the signal for transmission at a greater distance in the wireless channel. In one embodiment, the PA 1319 is provide to an input of a matching network 1321, which provides additional passive gain in the receiver path. The matching network 1321 is coupled to an antenna 1001 for transmitting a data packet in the wireless channel. The antenna 1001 represents any of the antennas 201, 204 and/or 206 previously described. In an alternative embodiment, the matching network 1321 is not provided and the output of the PA 1319 drives the antenna 1001. The DAC 1305 and the LPF 1307 and/or the mixer 1309 and/or the PA 1319 and/or the matching network 1321 may be individually or collectively referred to as a transmitter circuit.

In the receiver path, signals received via the antenna 1001 are provided through a receiving circuit including the matching network 1321 (if provided), which in one embodiment is a high-gain passive matching network in the receive path. The received signal is shown provided to a variable attenuator 1323 (also part of the receiver circuit) which feeds an RX input of the mixer 1309. The mixer 1309 reduces the frequency of the received signal from a relatively-higher frequency to some relatively lower frequency, e.g., baseband (DC) or a low intermediate frequency (IF) such as 1 MHz. The baseband signal output from the mixer 1309 is provided to an LPF 1325 which blocks out-of-channel and out-of-band interference and which may provide additional gain or attenuation. The output of the LPF 1325 is operably coupled to a variable gain amplifier (VGA) 1327, which may provide larger values of gain after removing adjacent-channel interference. The output of the VGA 1327 is coupled to an analog to digital converter (ADC) 1329, which provides a sampled, quantized representation of the input signal to the RX PHY portion of the digital PHY 1303. The output of the RX PHY is provide to the MAC 1301. The RX PHY and the MAC 1301 control the radio and demodulates the output samples of the ADC 1329 and then decodes the bits intended for the tag device. The bits are provided to the controller 207 via the host bus 205. The MAC 1301 and/or the digital PHY 1303 and/or the ADC 1329 individually or collectively form a frame processing circuit.

It is appreciated that the microwave frequency transceiver 203 may be implemented according to many alternative configurations. The microwave frequency transceiver 1300 enables any of the tags described herein to be autonomous since it generates its own microwave frequency carrier (e.g., MC) which is used for communications including transmitting data to external devices. Data communications and energy harvesting may each occur on any one or more of multiple microwave frequency bands. The microwave frequency communications may be implemented according to any one or more of the standard communication protocols, such as Wi-Fi or Bluetooth or the like, for enabling communication with common devices, such as smart phones or the like.

Although the present invention has been described in considerable detail with reference to certain preferred versions thereof, other versions and variations are possible and contemplated. For example, the circuits described herein may be implemented in any suitable manner including logic devices or circuitry or the like. The circuits described herein may include inverting devices implementing positive or negative logic or the like in which any signal may be inverted. The present invention is described using circuits operating with digital or binary bytes and words where it is understood that the circuitry applies to digital or binary values comprising any number of bits. Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An autonomous battery-free microwave frequency communication device, comprising:
   a capacitor;
   at least one antenna;
   a microwave energy harvesting system which is configured to harvest microwave energy from charging packets received via said at least one antenna and configured to store the microwave energy on said capacitor, wherein the microwave energy harvesting system is configured to transmit a response packet in response to determining that the capacitor is sufficiently charged;
   a microwave frequency transceiver powered by energy stored on said capacitor, which is configured to use a portion of energy stored on said capacitor to autonomously generate a microwave frequency carrier and to autonomously transmit information using said microwave frequency carrier according to a predetermined communications protocol via said at least one antenna; and
   a control system powered by energy stored on said capacitor, which is configured to provide said information for transmission, wherein the charging packets comprise wireless local area network (WLAN) protocol beacon frames that are selectively generated for charging the capacitor.

2. The autonomous battery-free microwave frequency communication device of claim 1, wherein said microwave energy harvesting system is configured to detect and convert microwave energy comprising a communication packet transmitted by an external device and received by said at least one antenna.

3. The autonomous battery-free microwave frequency communication device of claim 1, wherein said microwave energy received via said at least one antenna comprises microwave energy in a first microwave frequency band, and wherein said microwave frequency transceiver is configured to transmit information according to said predetermined communications protocol in a second microwave frequency band which is different from said first microwave frequency band.

4. The autonomous battery-free microwave frequency communication device of claim 1, wherein said at least one antenna comprises at least one common antenna which is coupled to and used by both said microwave energy harvesting system and said microwave frequency transceiver.

5. The autonomous battery-free microwave frequency communication device of claim 1, wherein said at least one antenna comprises at least one first antenna coupled to said microwave energy harvesting system for energy harvesting and at least one second antenna coupled to said microwave frequency transceiver for communications.

6. The autonomous battery-free microwave frequency communication device of claim 1, wherein said microwave frequency transceiver comprises:
   a frame generation circuit configured to generate a data frame formatted according to said predetermined communications protocol using energy stored on said capacitor;
   a microwave frequency carrier generation circuit configured to generate said microwave frequency carrier according to said predetermined communications protocol using energy stored on said capacitor;
   a modulator circuit configured to modulate said data frame on said microwave frequency carrier according to said predetermined communications protocol using energy stored on said capacitor to provide modulation information; and
   a transmitter circuit configured to transmit said modulation information via said at least one antenna according to said predetermined communications protocol using energy stored on said capacitor.

7. The autonomous battery-free microwave frequency communication device of claim 1, wherein said microwave frequency transceiver comprises:
   a receiver circuit configured to receive modulated information via said at least one antenna according to said predetermined communications protocol using energy stored on said capacitor;
   a microwave frequency carrier generation circuit configured to generate said microwave frequency carrier according to said predetermined communications protocol using energy stored on said capacitor;
   a demodulator circuit configured to demodulate said received modulated information using said microwave frequency carrier according to said predetermined communications protocol using energy stored on said capacitor to provide a received data frame; and
   a frame processing circuit configured to process said received data frame formatted according to said predetermined communications protocol using energy stored on said capacitor.

8. The autonomous battery-free microwave frequency communication device of claim 1, wherein said predetermined communications protocol comprises either one of a Wi-Fi communications protocol and a Bluetooth communications protocol.

9. The autonomous battery-free microwave frequency communication device of claim 1, wherein said control system comprises:
   a controller configured to processes information received by said microwave frequency transceiver and to generate information to be transmitted by said microwave frequency transceiver; and
   a non-volatile memory coupled to said controller.

10. The autonomous battery-free microwave frequency communication device of claim 1, wherein said microwave energy harvesting system transfers and stores microwave energy received via said at least one antenna onto said capacitor during a first time period, and wherein said microwave frequency transceiver autonomously transmits information during a second time period which is mutually exclusive relative to said first time period.

11. The autonomous battery-free microwave communication device defined in claim 1, wherein the charging packets are formatted to prevent interoperability with other microwave frequency communication devices.

12. The autonomous battery-free microwave communication device defined in claim 1, wherein the response packet comprises a probe request packet.

13. A method of performing autonomous communications by a battery-free device comprising:
   receiving charging packets that comprise wireless local area network (WLAN) clear to send (CTS) packets via at least one antenna;
   harvesting microwave energy from the received wireless local area network (WLAN) clear to send (CTS) packets and storing the harvested microwave energy on a capacitor, wherein the wireless local area network (WLAN) clear to send (CTS) packets are selectively generated for charging the capacitor;
   transmitting a response packet using the at least one antenna in response to determining that the capacitor is sufficiently charged;

generating at least one data frame formatted according to a first communications protocol using energy stored on the capacitor;
generating a microwave frequency carrier using energy stored on the capacitor;
modulating the microwave frequency carrier with the data frame using energy stored on the capacitor to provide a modulated information; and
transmitting the modulated information via the at least one antenna using energy stored on the capacitor.

14. The method of claim 13, wherein said receiving microwave energy comprises receiving microwave energy on a plurality of directional antennas.

15. The method of claim 13, wherein said receiving microwave energy comprises receiving the microwave energy on at least one first antenna provided for energy harvesting, and wherein said transmitting the modulated information comprises transmitting the modulated information on at least one second antenna provided for communications.

16. The method of claim 13, further comprising:
said receiving microwave energy comprising receiving at least one microwave modulated data frame;
demodulating the microwave modulated data frames using the microwave frequency carrier and using energy stored on the capacitor to provide at least one received data frame; and
processing the at least one received data frame according to the first communications protocol to retrieve transmitted information using energy stored on the capacitor.

17. The method of claim 13, wherein said receiving microwave energy comprises receiving microwave communications in a first microwave frequency band, and wherein said transmitting the modulated information comprises transmitting the modulated information in a second microwave frequency band which is different from the first microwave frequency band.

18. The method of claim 13, wherein said receiving microwave energy, harvesting the received microwave energy and storing harvested energy comprises receiving microwave energy, harvesting the received microwave energy and storing harvested energy during a first time period, and wherein said transmitting the modulated information comprises transmitting the modulated information during a second time period which is mutually exclusive relative to the first time period.

19. The method of claim 13, further comprising:
said receiving microwave energy comprising receiving microwave modulated data frames; and
processing the microwave modulated data frames to retrieve demodulated data using energy stored on the capacitor.

20. The method of claim 19, further comprising using the demodulated data to generate at least a portion of a modulated data sequence.

21. A wireless radio frequency tag device, comprising:
a physical article configured for a predetermined purpose; and
an autonomous battery-free microwave frequency communication device embedded on said physical article to enhance said predetermined purpose comprising:
a capacitor;
at least one antenna;
a microwave energy harvesting system which is configured to harvest and store microwave energy from wireless local area network (WLAN) request to send (RTS) packets that are selectively generated to charge the capacitor received via said at least one antenna onto said capacitor;
a microwave frequency transceiver powered by energy stored on said capacitor, which is configured to use a portion of energy stored on said capacitor to autonomously generate a microwave frequency carrier and to autonomously transmit information using said microwave frequency carrier according to a predetermined communications protocol via said at least one antenna; and
a control system powered by energy stored on said capacitor, which is configured to provide said information for transmission, wherein said information is associated with said predetermined purpose, and wherein said control system comprises a memory for storing data associated with said predetermined purpose, wherein said physical article comprises an advertisement flyer and wherein said information and data is associated with at least one commercial enterprise.

* * * * *